United States Patent [19]

Kolwey

[11] 4,124,181
[45] Nov. 7, 1978

[54] HELICOPTER EXTERNAL LOAD PICKUP SYSTEM

[76] Inventor: Herman G. Kolwey, 103 Elm Ct., Lexington Park, Md. 20653

[21] Appl. No.: 845,196

[22] Filed: Oct. 25, 1977

[51] Int. Cl.² .......................................... B64D 1/22
[52] U.S. Cl. ........................... 244/137 R; 9/8 R; 9/14; 258/1.2; 294/66 R; 294/82 R
[58] Field of Search ............... 244/137 R, 3; 258/1.2; 9/8 R, 8 P, 14; 114/294, 221 R; 294/66 R, 82 R; 43/17.2

[56] References Cited

U.S. PATENT DOCUMENTS

| | | | |
|---|---|---|---|
| 142,638 | 9/1873 | Long | 294/82 R |
| 184,792 | 11/1876 | Mihan | 114/294 |
| 1,758,744 | 5/1930 | Haubert | 294/82 R |
| 1,999,777 | 4/1935 | Palmer | 258/1.2 |
| 2,310,697 | 2/1943 | Howell | 258/1.2 |
| 2,449,417 | 9/1948 | Schultz | 258/1.2 |
| 2,594,120 | 4/1952 | Busher | 43/17.2 |
| 3,022,763 | 2/1962 | Turrentine | 114/221 R |
| 3,036,315 | 5/1962 | Karnow | 9/14 |
| 3,360,811 | 1/1968 | Barflebaugh | 9/8 R |
| 3,444,569 | 5/1969 | Greenberg et al. | 9/14 |
| 3,799,097 | 3/1974 | Robertson | 114/294 |
| 3,863,590 | 2/1975 | Karl et al. | 9/8 P |

FOREIGN PATENT DOCUMENTS 1,450,926  7/1966  France ................................ 244/137 R Primary Examiner—Galen L. Barefoot
Attorney, Agent, or Firm—R. Sciascia; R. Beers; S. Sheinbein

[57] ABSTRACT

A system for recovery of cargo floating at sea with a helicopter or ship. A hook is rigidly secured to a float attached to a hoist line. The hook is dragged through the water until it contacts and connects with a buoyant line attached to the cargo. The cargo may then be pulled aboard the helicopter or ship by winching in the hoist line.

5 Claims, 3 Drawing Figures

HELICOPTER EXTERNAL LOAD PICKUP SYSTEM

STATEMENT OF GOVERNMENT INTEREST

The invention described herein may be manufactured and used by or for the government of the United States of America for governmental purposes without the payment of any royalties thereon or therefore.

BACKGROUND OF THE INVENTION

The present invention relates to devices for acquiring and retrieving objects from water and more particularly to devices for retrieving cargo floating at sea by helicopters.

In the past, the pickup of objects floating at sea by helicopters or ships has been accomplished with difficulty. Oftentimes it has been necessary to lower crewmen from the aircraft or ship into the water to secure the cargo to be acquired before lifting it aboard the craft. To obviate the need to use that inconvenient, time consuming and risky procedure, extensible poles equipped with hooks at their terminal ends have been employed to latch onto objects floating at sea. However, such poles have proven clumsy and dangerous when used in rough sea states and especially unmanageable when helicpoters cannot hover close to the object to be retrieved. Alternately, bridle suspended nets have been used to scoop up cargo, but such devices have required careful orientation with respect to the position of the objects to be recovered, frequently difficult to accomplish even when such devices have been fitted with guiding fins or vanes. Clearly, all of the above described techniques suffer from similar limitations especially severe in rough sea states when objects to be recovered are bobbing up and down in the water. These procedures are unwieldly, time consuming, and even dangerous to the personnel attempting to use them.

SUMMARY OF THE INVENTION

Accordingly, the present invention comprises a recovery system for use by a helicopter or ship in retrieving objects floating at sea. A hook is secured to the bottom of a float which is in turn attached to a hoist line suspended from the helicopter or ship. The hook is provided with a slot at its closed end. A buoyant line knotted at intervals along its length is attached to the object to be recovered and is disposed outward in the water. In operation, the float and hook are dragged through the water nearby the object to be recovered until the knotted line is contacted by the hook and one of the knots in the line becomes secured in the slot of the hook. The object may then be pulled aboard the helicopter or ship by the hoist line, buoyant line, and the connection between them at the slot.

OBJECTS OF THE INVENTION

It is therefore an object of the present invention to provide an efficient system by which helicopters and ships may recover objects floating at sea.

It is another object of the present invention to provide a recovery system rapid in operation and simple to use.

It is a further object of the present invention to provide a recovery system durable in structure and economic to manufacture.

It is yet another object of the present invention to provide a recovery system completely safe to use and otherwise well adapted to the purposes for which it is intended.

BRIEF DESCRIPTION OF THE DRAWINGS

Other objects and many of the attendant advantages of the present invention will be readily apparent as the invention becomes better understood by references to the following detailed description with the appended claims, when considered in conjunction with the accompanying drawings, wherein:

DESCRIPTION OF THE PREFERRED EMBODIMENT

Figure 1:
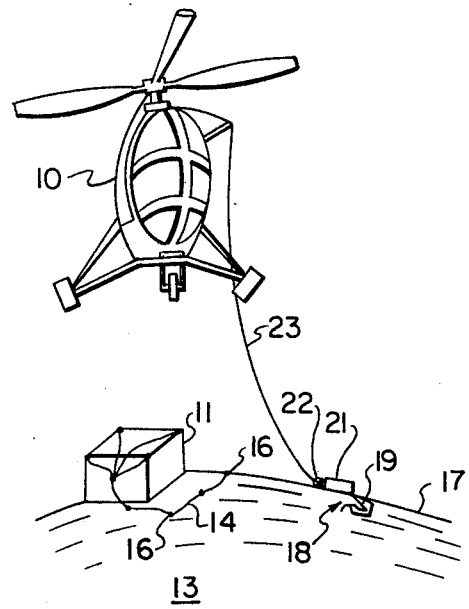
FIG. 1 is a pictorial view of the deployment of the recovery system.

Referring now to the drawing, wherein like reference characters designate like or corresponding parts throughout the several views, FIG. 1 shows a helicopter 10 utilizing the present invention to pick up an object 11 floating at sea 13. A line 14, of buoyant material such as polypropline, is attached to cargo object 11 and is preferably tied in knots 16 at 5 foot intervals along its length (approximately 50 feet). Line 14 floats on the surface 17 of the water alongside and outward from the cargo 11. A metal hook 18 having a slot 19 slightly wider than the width of the line 14 at its closed end is rigidly secured to the bottom of styrofoam float 21. Float 21, in turn, is attached by ring 22 to hoist line 23 suspended from helicopter 10.

In operation, the hook 18 and float 21 secured thereto are towed by helicopter 10 by means of the hoist line 23 along the surface 17 of the water and over line 14. Thereupon, the hook 18 contacts the line 14 and directs it to slide into the slot 19 where one of the knots 16 in the line 14 may become engaged by the sides of the slot 19. Knots 16 being too large to slip through the slot 19 form a secure point of connection between line 14 and the slot.

Figure 2:
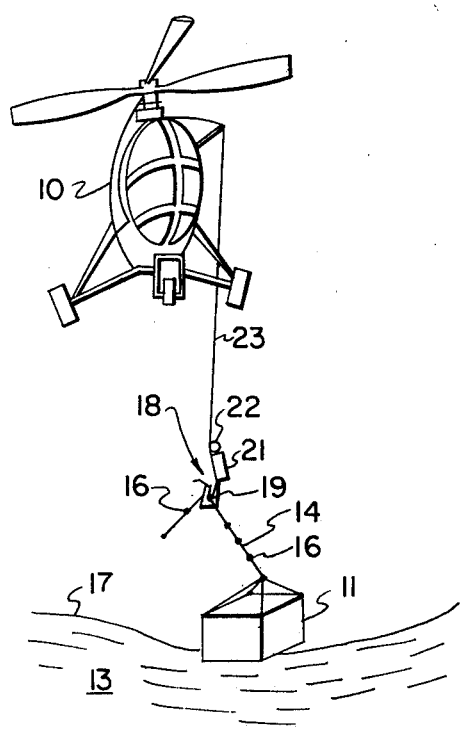
FIG. 2 is a pictorial view of the recovery system after engagement of the slot and knotted line.

Object 11 may be retrieved from the water by the helicopter 10 (FIG. 2) after the hook 18 has engaged the line 14. Helicopter 10 may lift the object 11 out of the water by winching in hoist line 23.

Figure 3:
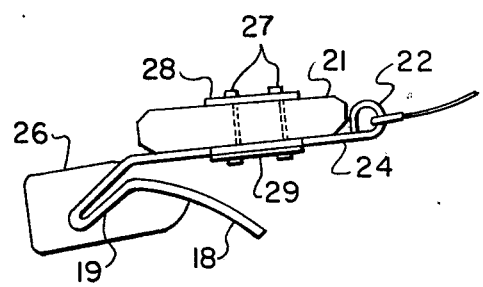
FIG. 3 is a side view of the hook, slot, and float components of the recovery system.

FIG. 3 shows a detailed side view of the float 21, hook 18, and slot 19, and ring 22 described hereinabove. A steel rod 24 is bent to form ring 22 approximately 2 inches in diameter at one end, and slot 19, approximately 4 inches long and slightly more than ¾ of an inch wide, at the opposite end extending down at approximately a thirty degree angle from the central part of the rod 24.

The rod is further bent to form hook 18 immediately in front of slot 19 approximately 8 inches long, opening up to a width of approximately 6 inches relative to the central part of the rod 24. A rectangular plate structure 26 is welded around slot 19 and part of hook 18 to reinforce those structures and additionally to act as a guide vane and as ballast for float 21 when it is towed along the surface of the water. Float 21 may be comprised of a rectangular styrofoam block 14 inches long, 12 inches wide, and 4 inches deep with its edges beveled at its front and rear ends. Float 21 is secured to rod 24 immediately behind ring 22 in any conventional manner. One such way is to employ bolts 27 which extend through float 21 between top plate 28 and bottom plate 29 which is welded to the rod 24. The rod 24 is 3 feet long so that slot 19 and plate 26 may extend beyond the rear of float 21 thereby providing greater stability as the float 21, slot 19, and hook 18 are towed through the water.

Therefore, it is apparent that the disclosed system for recovering objects floating at sea is a simple, rapid, and efficient technique employing equipment economic to manufacture, durable in use, and yet effective in operation. Further, the present invention allows helicopters and ships to recover objects floating at sea without manual intervention and, therefore, without hazard to personnel even in high sea states.

Obviously, other embodiments and modifications of the present invention will readily come to those of ordinary skill in the art having the benefit of the teachings presented in the foregoing description and drawings. For example, the float may be provided with a hydrodynamic shape, or the knots 16 on line 14 may be replaced by wooden or metal stops which, when secured along the line, may also provide additional buoyancy for it. It is therefore, to be understood that this invention is not to be limited to the embodiments and modifications described, and said other embodiments and modifications are intended to be included within the scope of the appended claims.

What is claimed is:

1. Apparatus for recovery by a vehicle of objects floating at sea, comprising:

a hook;
   a slot disposed at the closed end of said hook;
   a float secured to said hook, said float being comprised of styrofoam secured between two bolt connected plates, one of which is welded to said hook;
   a hoist line suspended from said vehicle and attached to said hook near its open end opposite said slot; and
   a buoyant line attached to said object floating at sea, said line having stops along its length;
   whereby when said float, hook, and slot are towed by said hoist line from said vehicle along the surface of the sea at said buoyant line, said slot may securely engage one of said stops along said buoyant line enabling recovery of said object.

2. The apparatus of claim 1 further including a plate surrounding said slot for providing reinforcement for said slot and for guiding said hook, slot, and float as they are towed through the water.

3. The apparatus of claim 1 wherein said hook and said slot are formed from a metal rod bent to shape, and further including an attachment ring formed by said bent rod at its forward end opposite said slot.

4. The apparatus of claim 1 wherein said stops comprise of knots in said buoyant line.

5. The apparatus of claim 1 wherein said vehicle is a helicopter.

* * * * *